US011190288B2

(12) United States Patent
Hotaka et al.

(10) Patent No.: US 11,190,288 B2
(45) Date of Patent: Nov. 30, 2021

(54) BROADCAST SYSTEM

(71) Applicant: NEC Corporation, Tokyo (JP)

(72) Inventors: Tomoaki Hotaka, Tokyo (JP); Minoru Hirai, Tokyo (JP)

(73) Assignee: NEC CORPORATION, Tokyo (JP)

(*) Notice: Subject to any disclaimer, the term of this patent is extended or adjusted under 35 U.S.C. 154(b) by 121 days.

(21) Appl. No.: 16/487,464

(22) PCT Filed: Feb. 22, 2018

(86) PCT No.: PCT/JP2018/006409
§ 371 (c)(1),
(2) Date: Aug. 21, 2019

(87) PCT Pub. No.: WO2018/155544
PCT Pub. Date: Aug. 30, 2018

(65) Prior Publication Data
US 2019/0379473 A1    Dec. 12, 2019

(30) Foreign Application Priority Data

Feb. 23, 2017  (JP) .............................. JP2017-031919
Feb. 21, 2018  (JP) .............................. JP2018-028346

(51) Int. Cl.
*H04H 20/57*    (2008.01)
*H01Q 21/24*    (2006.01)
(Continued)

(52) U.S. Cl.
CPC ............ *H04H 20/57* (2013.01); *H01Q 21/24* (2013.01); *H04H 20/72* (2013.01); *H04N 21/235* (2013.01); *H04N 21/2383* (2013.01)

(58) Field of Classification Search
CPC combination set(s) only.
See application file for complete search history.

(56) References Cited

U.S. PATENT DOCUMENTS 5,729,825 A * 3/1998 Kostreski ............. H04N 1/0035
                                                        725/62
5,841,433 A * 11/1998 Chaney ................ H04N 21/482
                                                        725/50
(Continued)

FOREIGN PATENT DOCUMENTS

JP   2016-072662 A   5/2016
JP   2016-076789 A   5/2016
(Continued)

OTHER PUBLICATIONS

"Transmission System for Digital Terrestrial Television Broadcasting," ARIB STD-B31 Version 2.2, Mar. 2014, Association of Radio Industries and Businesses, 195 pages, Internet <URL: https://www2.arib.or.jp/kikaku_download/cgi-bin/index_dl.php?sno=STD-B31-2.2>.

(Continued)

*Primary Examiner* — Syed Ali
(74) *Attorney, Agent, or Firm* — Sughrue Mion, PLLC

(57) ABSTRACT

An input unit 21 receives the input of conventional image-quality playback data adapted to terrestrial digital television broadcast and high image-quality playback data. A combining unit 22 combines the conventional image-quality playback data and the high image-quality playback data. A data configuration unit 23, on the basis of combined data obtained by combining the conventional image-quality playback data and the high image-quality playback data by means of the combining unit 22, generates data for one polarized antenna transmission and data for another polarized antenna transmission.

5 Claims, 12 Drawing Sheets

(51) Int. Cl.
*H04H 20/72* (2008.01)
*H04N 21/235* (2011.01)
*H04N 21/2383* (2011.01)

(56) References Cited

U.S. PATENT DOCUMENTS

| | | | | |
|---|---|---|---|---|
| 6,188,873 | B1* | 2/2001 | Wickman | H04H 20/63 |
| | | | | 455/11.1 |
| 6,976,266 | B1* | 12/2005 | Chaney | H04N 5/44543 |
| | | | | 725/39 |
| 7,158,577 | B1* | 1/2007 | Oshima | H04L 27/183 |
| | | | | 329/304 |
| 7,894,541 | B2* | 2/2011 | Oshima | H04L 27/3488 |
| | | | | 375/261 |
| RE42,643 | E* | 8/2011 | Oshima | H04L 1/007 |
| | | | | 375/219 |
| 2006/0294573 | A1* | 12/2006 | Rogers | H04N 7/17309 |
| | | | | 725/147 |
| 2009/0080860 | A1* | 3/2009 | Nakano | H04N 5/765 |
| | | | | 386/241 |
| 2010/0162307 | A1* | 6/2010 | Suh | H04H 60/73 |
| | | | | 725/39 |
| 2012/0127363 | A1* | 5/2012 | Kanojia | H04N 21/2181 |
| | | | | 348/384.1 |
| 2015/0245046 | A1* | 8/2015 | Tsukuba | H04N 19/46 |
| | | | | 375/240.25 |
| 2015/0256856 | A1* | 9/2015 | Tsukuba | H04N 19/30 |
| | | | | 375/240.25 |
| 2015/0334411 | A1* | 11/2015 | Yamamoto | H04N 19/119 |
| | | | | 375/240.16 |
| 2016/0197663 | A1 | 7/2016 | Stadelmeier et al. | |
| 2016/0337012 | A1* | 11/2016 | Kimura | H04B 7/0404 |
| 2017/0149516 | A1* | 5/2017 | Oh | H04L 65/4076 |
| 2017/0180077 | A1* | 6/2017 | Kwak | H04L 65/4076 |
| 2017/0373776 | A1* | 12/2017 | Lee | H04H 20/72 |
| 2018/0152256 | A1* | 5/2018 | Deshpande | H04N 21/4345 |

FOREIGN PATENT DOCUMENTS

| | | |
|---|---|---|
| JP | 2017-085467 A | 5/2017 |
| JP | 2017-135522 A | 8/2017 |
| JP | 2018-148253 A | 9/2018 |
| WO | 2015/118853 A1 | 8/2015 |

OTHER PUBLICATIONS

Written Opinion of the International Searching Authority of PCT/JP2018/006409 dated May 15, 2018.
International Search Report of PCT/JP2018/006409 dated May 15, 2018.
Communication dated Jul. 21, 2020 issued by the Japanese Patent Office in English Application No. 2019-501406.
Communication dated Feb. 7, 2020 from the European Patent Office in application No. 18757171.6.

* cited by examiner

Fig.11

| ITEM | 2K | 4K | | | | |
|---|---|---|---|---|---|---|
| | | | | | | |
| MODULATION METHOD | 64QAM | 64QAM | 256QAM | 1024QAM | 4096QAM |
| ENCODING RATE | 3/4 | 3/4 | 3/4 | 3/4 | 3/4 |
| TS RATE [Mbps] (1:7:5+5) | 9.83 | 14.04 | 18.72 | 23.40 | 28.09 |
| TS RATE [Mbps] (1:8:4+4) | 11.23 | 11.23 | 14.98 | 18.72 | 22.47 |
| TIME INTERLEAVE | I=0, 1 | I=0, 1 | I=0, 1 | I=0, 1 | I=0, 1 |

※ x:y:z IN TS RATE COLUMN=
NUMBER OF SEGMENTS IN A-HIERARCHY : NUMBER OF SEGMENTS IN C-HIERARCHY : NUMBER OF SEGMENTS IN B-HIERARCHY (HORIZONTAL POLARIZATION + VERTICAL POLARIZATION)

BROADCAST SYSTEM

CROSS REFERENCE TO RELATED APPLICATIONS

This application is a National Stage of International Application No. PCT/JP2018/006409 filed Feb. 22, 2018, claiming priority based on Japanese Patent Application No. 2017-031919 filed Feb. 23, 2017 and Japanese Patent Application No. 2018-028346 filed Feb. 21, 2018, the disclosure of which are incorporated herein in their entirety by reference.

TECHNICAL FIELD

The present invention relates to a broadcast system.

BACKGROUND ART

Terrestrial digital television broadcasting is performed, and a receiver is able to reproduce a high quality image, as compared with terrestrial analog television broadcasting.

PTL 1 describes a television broadcast system employing polarization multiple-input and multiple-output (MIMO) transmission, and configured to transmit data for a receiving device movable by one of polarization signals, and transmit data for a receiving device fixedly installed by both of polarization signals.

NPL 1 describes a transmission method for terrestrial digital television broadcasting. Hereinafter, terrestrial digital television broadcasting based on the method described in NPL 1 is also referred to as current terrestrial digital television broadcasting.

CITATION LIST

Patent Literature

[PTL 1] Japanese Unexamined Patent Application Publication No. 2016-76789

Non-Patent Literature

[NPL 1] "Transmission system for terrestrial digital television broadcasting ARIB STD-B31 ver. 2.2", [online], March 2014, Association of Radio Industries and Businesses, [searched on Feb. 2, 2018], Internet <URL: https://www2.arib.or.jp/kikaku_download/cgi-bin/index_dl.php?sno=STD-B31-2.2>

SUMMARY OF INVENTION

Technical Problem

However, a receiver is required to reproduce a higher quality image, as compared with an image quality being enabled to be reproduced by current terrestrial digital television broadcasting. In other words, providing new terrestrial broadcasting (also referred to as novel terrestrial broadcasting) in which a receiver is able to reproduce a higher quality image is required. Further, it is desirable that the novel terrestrial broadcasting coexists with current digital television broadcasting.

Note that, in the television broadcast system described in PTL 1, it is assumed that current terrestrial digital television broadcasting, and broadcasting in which a transmission data amount is small, as compared with the current broadcasting, in other words, broadcasting having an image quality lower than the image quality of the current broadcasting are performed. In view of the above, an object of the present invention is to provide a broadcast system for novel terrestrial broadcasting that can coexist with terrestrial digital television broadcasting, and can reproduce a higher quality image, as compared with the terrestrial digital television broadcasting.

Solution to Problem

A broadcasting transmission system, according to the present invention, comprises: input means for inputting data for ordinary quality image reproduction according to terrestrial digital television broadcasting and data for high quality image reproduction; combining means for combining the data for the ordinary quality image reproduction and the data for high quality image reproduction; and data configuration means for generating transmission data for one of polarized antennas and transmission data for another of the polarized antennas, based on combined data acquired by combining the data for the ordinary quality image reproduction and the data for high quality image reproduction by the combining means.

A broadcasting reception system, according to the present invention, comprises: reception means for reproducing data for ordinary quality image reproduction and data for high quality image reproduction, based on data received via one of polarized antennas and data received via another of polarized antennas, the data being transmitted by a broadcasting transmission system comprising: input means for inputting the data for the ordinary quality image reproduction according to terrestrial digital television broadcasting, and the data for the high quality image reproduction; combining means for combining the data for the ordinary quality image reproduction and the data for the high quality image reproduction; and data configuration means for generating transmission data for the one of the polarized antennas and transmission data for the another of the polarized antennas, based on combined data acquired by combining the data for the ordinary quality image reproduction and the data for the high quality image reproduction by the combining means.

A broadcasting transmission/reception system, according to the present invention, comprises: the broadcasting transmission system according to any one of the aspects; and the broadcasting reception system according to any one of the aspects.

A broadcasting transmission method, according to the present invention, comprises: an input step of inputting data for ordinary quality image reproduction according to terrestrial digital television broadcasting and data for high quality image reproduction; a combining step of combining the data for the ordinary quality image reproduction and the data for high quality image reproduction; and a data configuration step of generating transmission data for one of polarized antennas and transmission data for another of polarized antennas, based on combined data acquired by combining the data for the ordinary quality image reproduction and the data for high quality image reproduction in the combining step.

A storage medium storing a broadcasting transmission program, according to the present invention, causes a computer to execute: input processing of inputting data for ordinary quality image reproduction according to terrestrial digital television broadcasting and data for high quality image reproduction; combining processing of combining the data for the ordinary quality image reproduction and the data for high quality image reproduction; and data configuration processing of generating transmission data for one of polarized antennas and transmission data for another of polarized antennas, based on combined data acquired by combining the data for the ordinary quality image reproduction and the data for high quality image reproduction in the combining processing.

Advantageous Effects of Invention

According to the present invention, it is possible to provide a novel terrestrial broadcast system that can coexist with terrestrial digital television broadcasting.

BRIEF DESCRIPTION OF DRAWINGS

FIG. 11 is an explanatory diagram illustrating an example of parameters according to a number of segments to be used by a B-hierarchy, and a modulation method of a 4K signal.

EXAMPLE EMBODIMENT

First Example Embodiment

Figure 1:
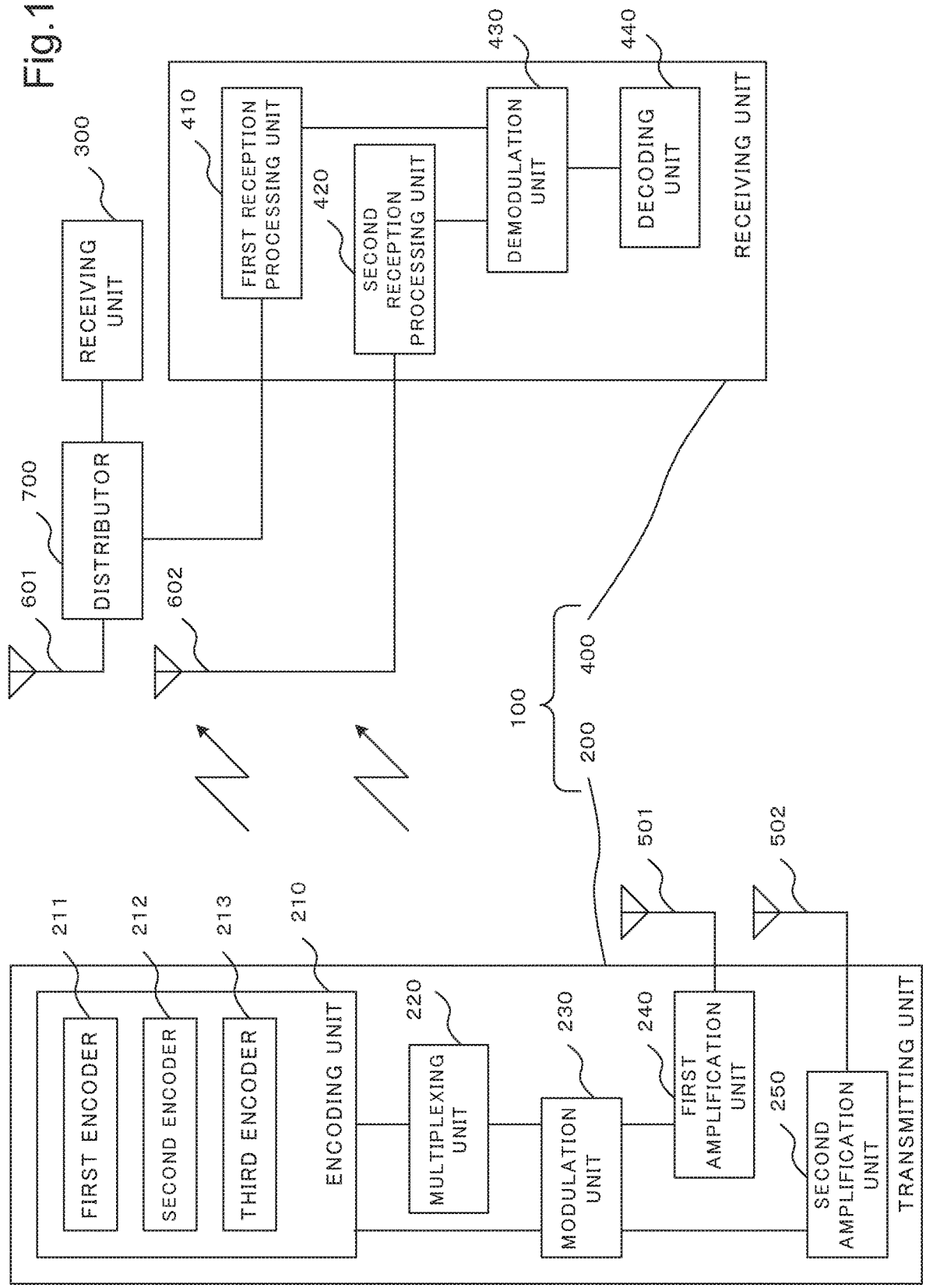
FIG. 1 is a block diagram illustrating a configuration example of a broadcast system according to a first example embodiment.

A broadcast system according to a first example embodiment of the present invention is described with reference to the drawings. FIG. 1 is a block diagram illustrating a configuration example of a broadcast system 100 according to the first example embodiment of the present invention.

As illustrated in FIG. 1, the broadcast system 100 according to the first example embodiment of the present invention includes a transmitting unit 200 and a receiving unit 400.

The transmitting unit 200 is connected to antennas 501 and 502. Further, a receiving unit 300 is connected to an antenna 601 via a distributor 700. The receiving unit 400 is connected to an antenna 602, and to the antenna 601 via the distributor 700.

A signal input to the antennas 501 and 502 by the transmitting unit 200 is converted into an electromagnetic wave, and the electromagnetic wave is radiated by the antennas 501 and 502. Further, the electromagnetic wave is received and converted into a reception signal by the antennas 601 and 602, and the reception signal after conversion is input to the receiving units 300 and 400.

Note that the distributor 700 inputs, to the receiving unit 300 and the receiving unit 400, the reception signal received by the antenna 601 and converted into a signal. Further, in the present example, it is assumed that the antennas 501 and 601 are antennas for horizontal polarization, and the antennas 502 and 602 are antennas for vertical polarization.

Further, the transmitting unit 200 and the receiving unit 400 may be implemented by a computer mounted with one or a plurality of circuits such as a central processing unit (CPU), which executes processing according to program control, for example. Specifically, for example, a software for implementing each of the below-described operations is mounted in the transmitting unit 200 and the receiving unit 400. Further, the transmitting unit 200 and the receiving unit 400 may be configured in such a way that each of the below-described operations is implemented by executing processing according to program control of the software.

Further, the receiving unit 300 is, for example, a television receiver capable of reproducing a video according to an input reception signal, based on a transmission method for current terrestrial digital television broadcasting.

Next, a configuration of the transmitting unit 200 is described with reference to a drawing. As illustrated in FIG. 1, the transmitting unit 200 according to the first example embodiment of the present invention includes an encoding unit 210, a multiplexing unit 220, a modulation unit 230, a first amplification unit 240, and a second amplification unit 250.

The encoding unit 210 includes a first encoder 211, a second encoder 212, and a third encoder 213.

A "2K" signal is input to the first encoder 211 and the second encoder 212. Note that 2K is a generic name of a video in which screen resolution becomes about 2000 in width×1000 in height. Therefore, in the example illustrated in FIG. 1, a signal associated with 2K (hereinafter, also referred to as a 2K signal) is input to the first encoder 211 and the second encoder 212. Note that screen resolution of 2K is, for example, 2048 in width×1080 in height, 1920 in width×1080 in height, 2048 in width×1152 in height, 2560 in width×1600 in height, 1440 in width×1080 in height, or the like.

Further, the first encoder 211 applies encoding processing based on H.264 to the input 2K signal. Furthermore, the first encoder 211 inputs the 2K signal after encoding processing to the multiplexing unit 220. Note that the first encoder 211 is prepared for providing a one-segment partial reception service for a mobile phone/mobile terminal (also referred to as a mobile reception service. Hereinafter, also referred to as one-segment). In view of the above, the 2K signal after encoding processing based on H.264 by the first encoder 211 is also referred to as a one-segment signal.

Further, the second encoder 212 applies encoding processing based on moving picture experts group (MPEG)-2 to the input 2K signal. Furthermore, the second encoder 212 inputs the 2K signal after encoding processing based on MPEG-2 to the multiplexing unit 220.

The multiplexing unit 220 multiplexes the one-segment signal input by the first encoder 211, and the 2K signal input by the second encoder 212 each other. Further, the multiplexing unit 220 inputs a multiplexed signal being the signal after multiplexing to the modulation unit 230.

Further, a "4K" signal is input to the third encoder 213. Note that 4K is a generic name of a video in which screen resolution becomes about 4000 in width×2000 in height. Therefore, in the example illustrated in FIG. 1, a signal associated with 4K (hereinafter, also referred to as a 4K signal) is input to the third encoder 213. Note that screen resolution of 4K is, for example, 4096 in width×2160 in height, 3840 in width×2160 in height, 4096 in width×2304 in height, 4096 in width×2048 in height, or the like.

Further, the third encoder 213 applies encoding processing based on H.265 to the input 4K signal. Furthermore, the third encoder 213 inputs the 4K signal after encoding processing based on H.265 to the modulation unit 230.

Note that any one of the one-segment signal, the 2K signal, and the 4K signal is a transport stream (TS).

The modulation unit 230 applies transmission-path encoding processing to the input one-segment signal, 2K signal, and 4K signal, and generates a first orthogonal frequency division multiplexing (OFDM) signal and a second OFDM signal. The transmission-path encoding processing will be described later.

The modulation unit 230 inputs the generated first OFDM signal to the first amplification unit 240. Further, the modulation unit 230 inputs the generated second OFDM signal to the second amplification unit 250.

Note that the antenna 501 for horizontal polarization is connected to the first amplification unit 240. The first amplification unit 240 amplifies the first OFDM signal input by the modulation unit 230 at a predetermined amplification rate. Further, the first amplification unit 240 inputs the first OFDM signal after amplification to the antenna 501.

The first OFDM signal amplified by the first amplification unit 240 is converted into an electromagnetic wave by the antenna 501, and radiated in horizontal polarization.

Further, the antenna 502 for vertical polarization is connected to the second amplification unit 250. The second amplification unit 250 amplifies the second OFDM signal input by the modulation unit 230 at a predetermined amplification rate. Further, the second amplification unit 250 inputs the second OFDM signal after amplification to the antenna 502.

The second OFDM signal amplified by the second amplification unit 250 is converted into an electromagnetic wave by the antenna 502, and radiated in vertical polarization.

Next, a configuration of the receiving unit 400 is described with reference to a drawing. As illustrated in FIG. 1, the receiving unit 400 according to the first example embodiment of the present invention includes a first reception processing unit 410, a second reception processing unit 420, a demodulation unit 430, and a decoding unit 440.

The antenna 601 for horizontal polarization is connected to the first reception processing unit 410 via the distributor 700. Further, the electromagnetic wave radiated via the antennas 501 and 502 and received by the antenna 601 is converted into a reception signal, and input to the first reception processing unit 410.

Further, the antenna 602 for vertical polarization is connected to the second reception processing unit 420. Furthermore, the electromagnetic wave radiated via the antennas 501 and 502 and received by the antenna 602 is converted into a reception signal, and input to the second reception processing unit 420.

Each of the first reception processing unit 410 and the second reception processing unit 420 applies, to the reception signal, predetermined processing such as processing of amplifying the reception signal, or processing of converting a frequency of the reception signal into a baseband being a frequency at which processing in the demodulation unit 430 being a signal processing means at a further later stage is enabled.

Further, the first reception processing unit 410 inputs, to the demodulation unit 430, the reception signal to which the predetermined processing is applied. Furthermore, the second reception processing unit 420 inputs, to the demodulation unit 430, the reception signal to which the predetermined processing is applied.

The demodulation unit 430 applies, to the input reception signal, demodulation processing according to transmission-path encoding processing, which is applied to the one-segment signal, the 2K signal, and the 4K signal by the modulation unit 230 of the transmitting unit 200, and generates a TS signal. Further, the demodulation unit 430 inputs the generated TS signal to the decoding unit 440. Note that demodulation processing in the demodulation unit 430 is performed by each unit in the demodulation unit 430 to be described later.

The decoding unit 440 has a function of enabling to generate a video signal by applying predetermined decoding processing to the input TS signal.

For example, it is assumed that the decoding unit 440 is able to generate a video signal based on a 4K signal by applying decoding processing based on H.265 to the input TS signal. Then, the decoding unit 440 is able to output the generated video signal. Further, the output video signal is input to a video display apparatus such as a television receiver, and a video based on the 4K signal is reproduced.

Further, for example, it is assumed that the decoding unit 440 is able to generate a video signal based on a 2K signal by applying decoding processing based on MPEG-2 to the input TS signal. Then, the decoding unit 440 is able to output the generated video signal. Further, the output video signal is input to a video display apparatus such as a television receiver, and a video based on the 2K signal is reproduced.

Further, for example, it is assumed that the decoding unit 440 is able to generate a video signal based on a one-segment signal by applying decoding processing based on H.264 to the input TS signal. Then, the decoding unit 440 is able to output the generated video signal. Further, the output video signal is input to a video display apparatus or the like, and a video based on the one-segment signal is reproduced.

Figure 2:
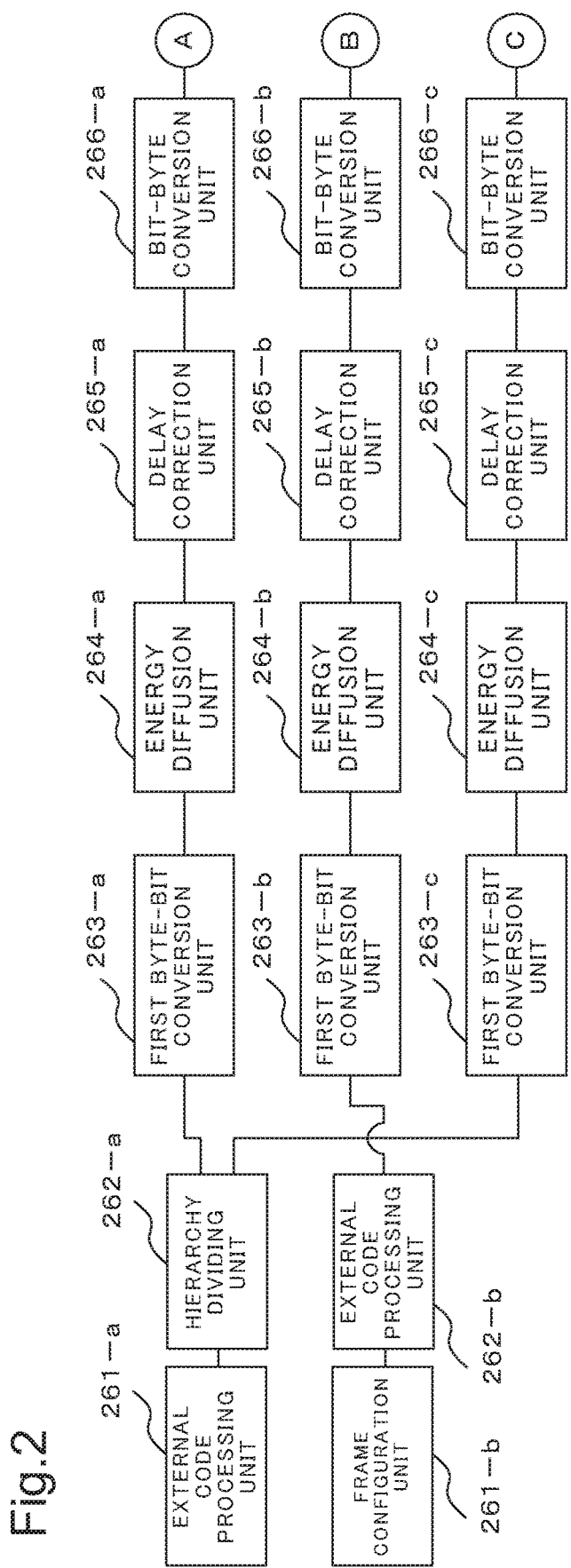
FIG. 2 is a block diagram illustrating a configuration example of a modulation unit according to the first example embodiment.
Figure 3:
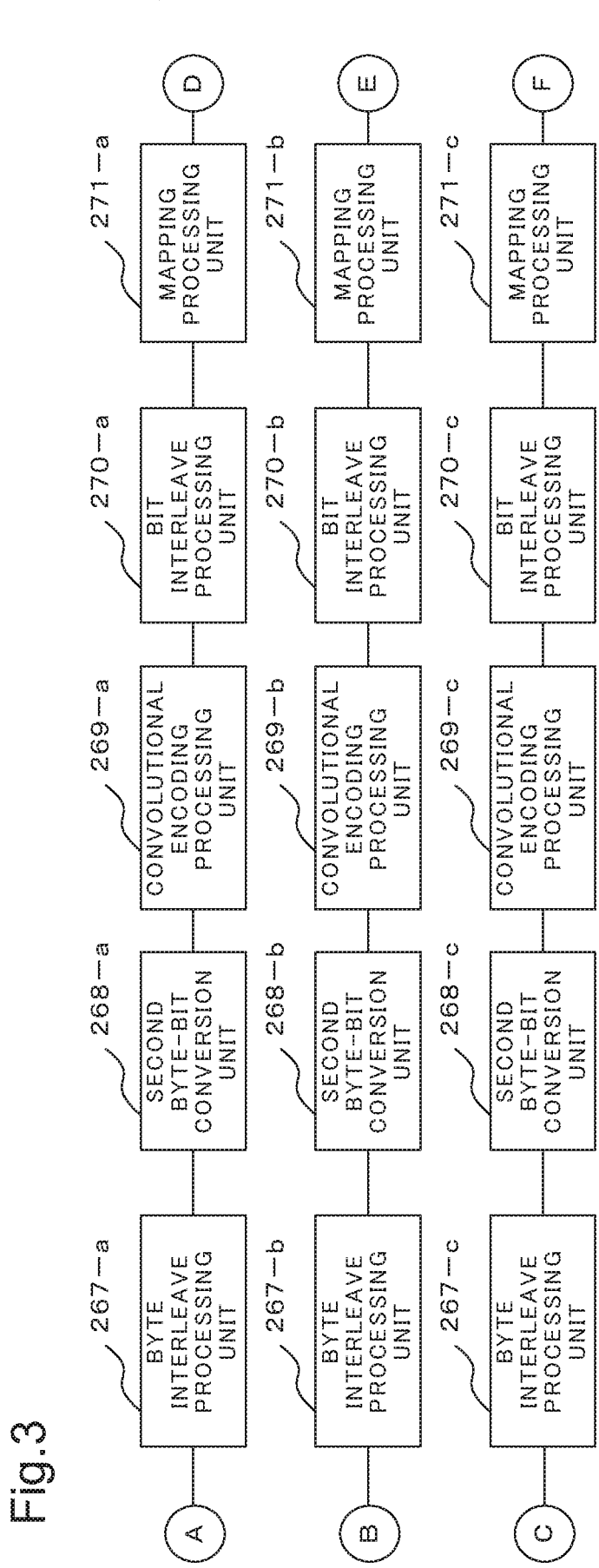
FIG. 3 is a block diagram illustrating a configuration example of the modulation unit according to the first example embodiment.
Figure 4:
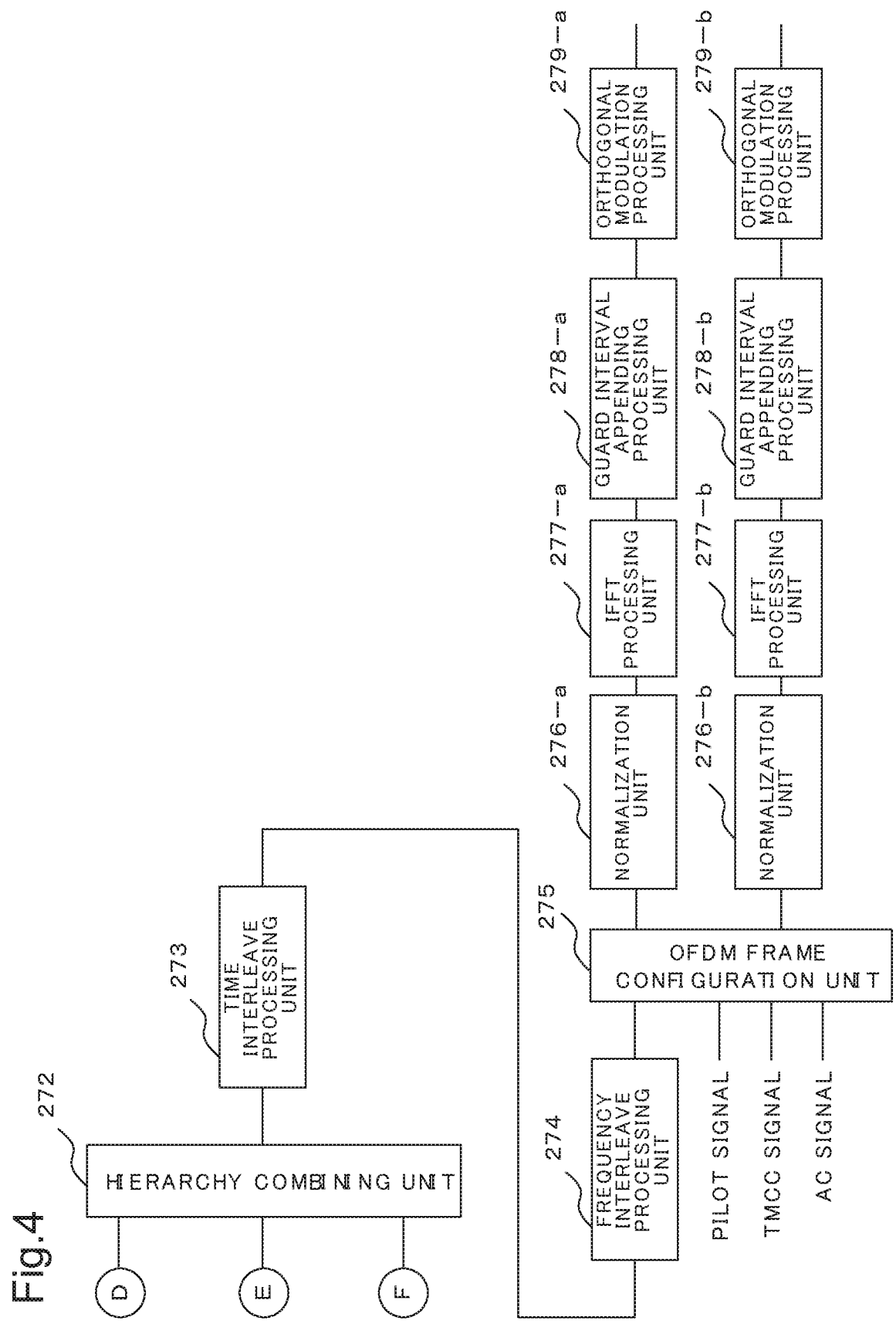
FIG. 4 is a block diagram illustrating a configuration example of the modulation unit according to the first example embodiment.

Next, transmission-path encoding processing to be performed by the modulation unit 230 is described. FIGS. 2 to 4 are block diagrams illustrating a configuration example of the modulation unit 230 according to the first example embodiment of the present invention. As illustrated in FIGS. 2 to 4, the modulation unit 230 according to the first example embodiment of the present invention includes an external code processing unit 261-*a*, a frame configuration unit 261-*b*, a hierarchy dividing unit 262-*a*, an external code processing unit 262-*b*, first byte-bit conversion units 263-*a* to 263-*c*, energy diffusion units 264-*a* to 264-*c*, delay correction units 265-*a* to 265-*c*, bit-byte conversion units 266-*a* to 266-*c*, byte interleave processing units 267-*a* to 267-*c*, second byte-bit conversion units 268-*a* to 268-*c*, convolutional encoding processing units 269-*a* to 269-*c*, bit interleave processing units 270-*a* to 270-*c*, mapping processing units 271-*a* to 271-*c*, a hierarchy combining unit 272, a time interleave processing unit 273, a frequency interleave processing unit 274, an OFDM frame configuration unit 275, normalization units 276-*a* and 276-*b*, inverse fast Fourier transform (IFFT) processing units 277-*a* and 277-*b*, guard interval appending processing units 278-*a* and 278-*b*, and orthogonal modulation processing units 279-*a* and 279-*b*.

A one-segment signal and a 2K signal that are multiplexed each other are input to the external code processing unit 261-*a*. Further, the external code processing unit 261-*a* applies processing of appending a predetermined code for inspection to each of the input one-segment signal and 2K signal. In the present example, the external code processing unit 261-*a* applies processing of appending a Reed-Solomon code (RS (204, 188)) to each of the input one-segment signal and 2K signal. Further, the external code processing unit 261-*a* inputs, to the hierarchy dividing unit 262-*a*, a one-segment signal and a 2K signal having a code for inspection appended to each of the input one-segment signal and 2K signal.

A 4K signal is input to the frame configuration unit 261-*b*. Further, the frame configuration unit 261-*b* performs frame configuration processing such as appending dummy data (stuffing byte) for processing the input 4K signal as a TS packet having a predetermined fixed length, for example. Further, the frame configuration unit 261-*b* inputs, to the external code processing unit 262-*b*, the 4K signal to which frame configuration processing is applied.

The external code processing unit 262-*b* applies processing of appending a predetermined code for inspection to the input 4K signal. In the present example, the external code processing unit 262-*b* applies processing of appending a Reed-Solomon code (RS (204, 188)) to each of the input 4K signals. Further, the external code processing unit 262-*b* inputs, to the first byte-bit conversion unit 263-*b*, the 4K signals having the code for inspection appended to each of the input 4K signals.

The hierarchy dividing unit 262-*a* divides the one-segment signal and the 2K signal which are multiplexed each other, and inputs the one-segment signal to the first byte-bit conversion unit 263-*a*. Further, the hierarchy dividing unit 262-*a* inputs the 2K signal to the first byte-bit conversion unit 263-*c*.

Figure 5:
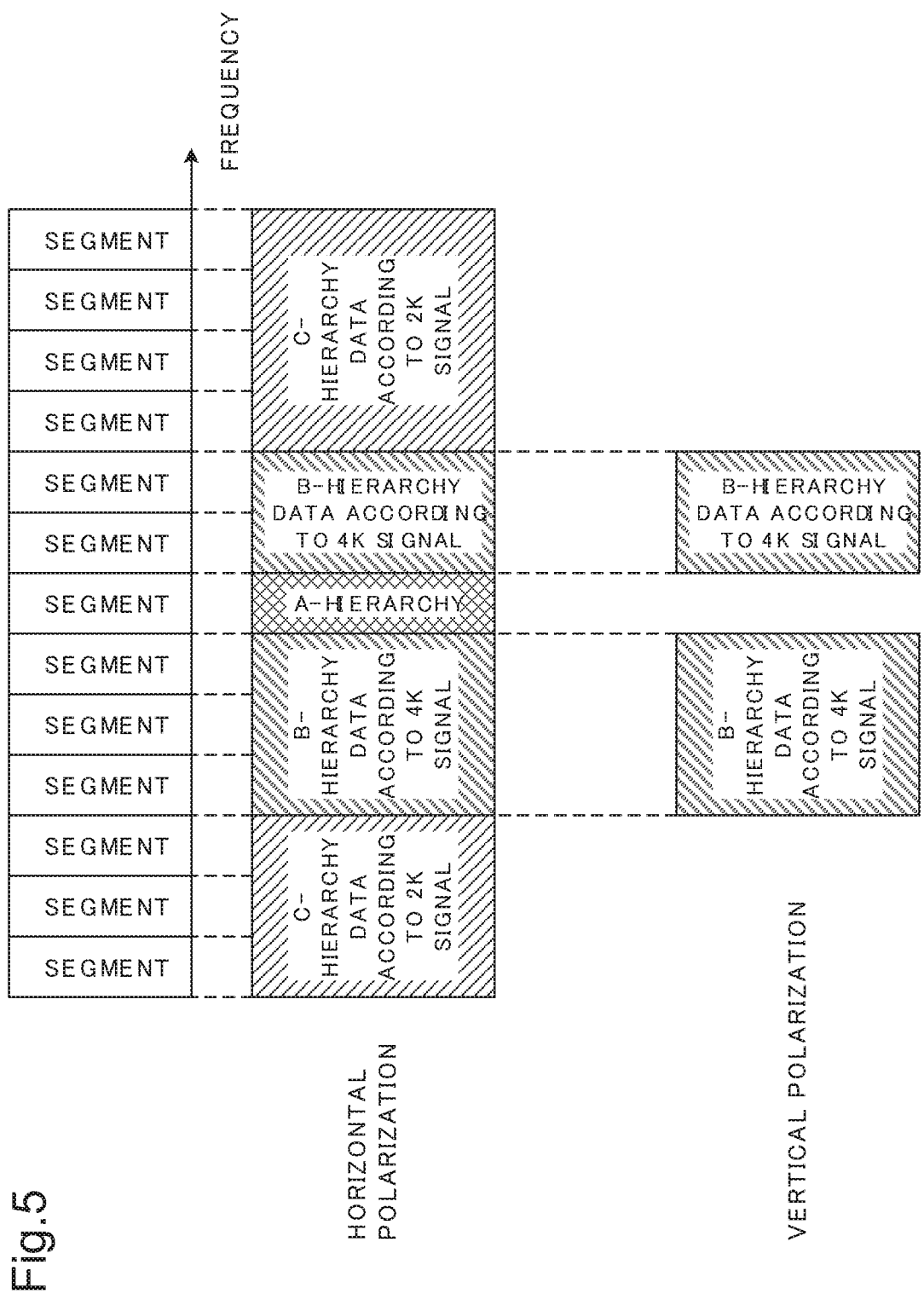
FIG. 5 is an explanatory diagram illustrating an example of a transmission method.
Figure 6:
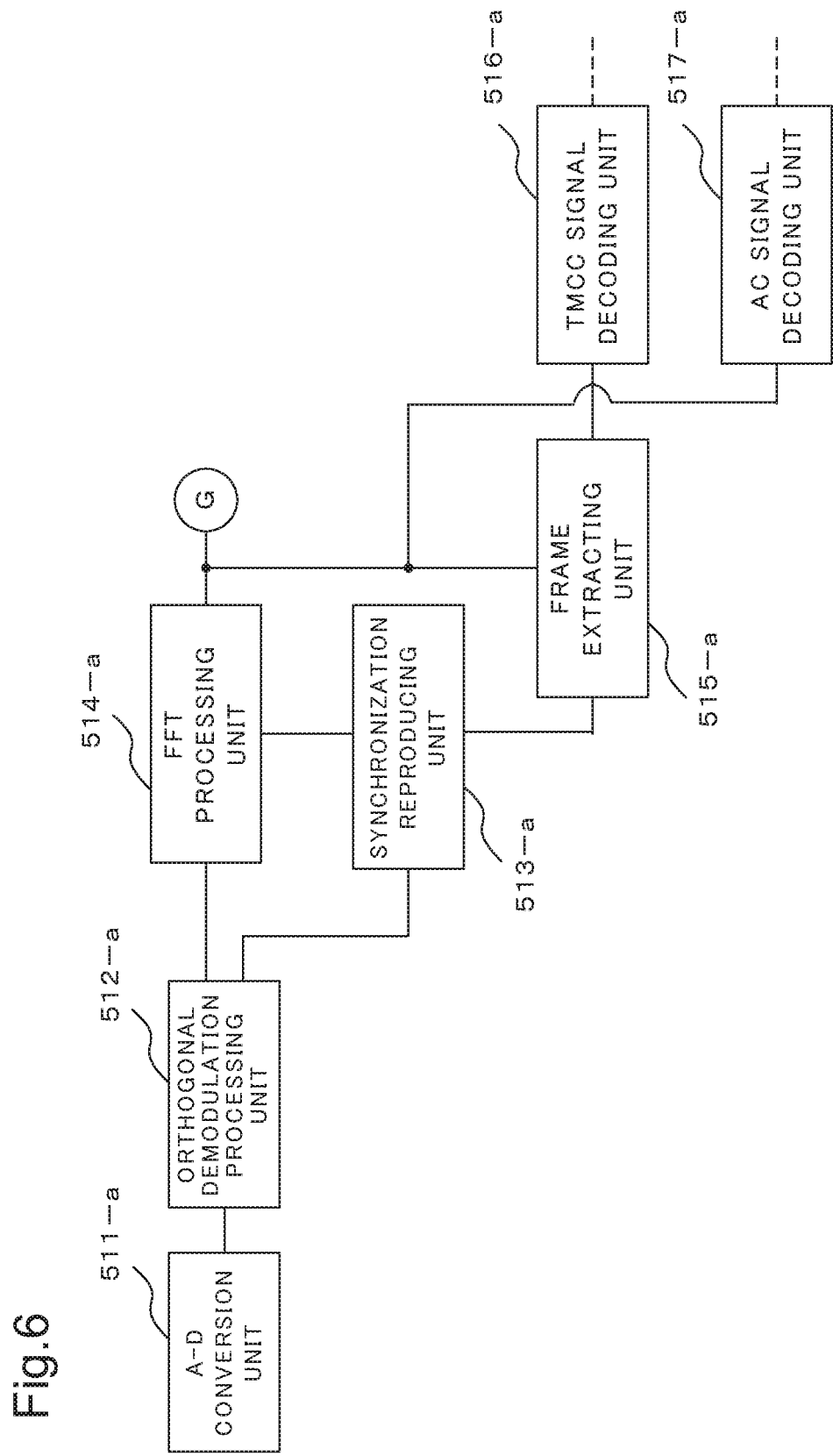
FIG. 6 is a block diagram illustrating a configuration of a demodulation unit according to the first example embodiment.
Figure 7:
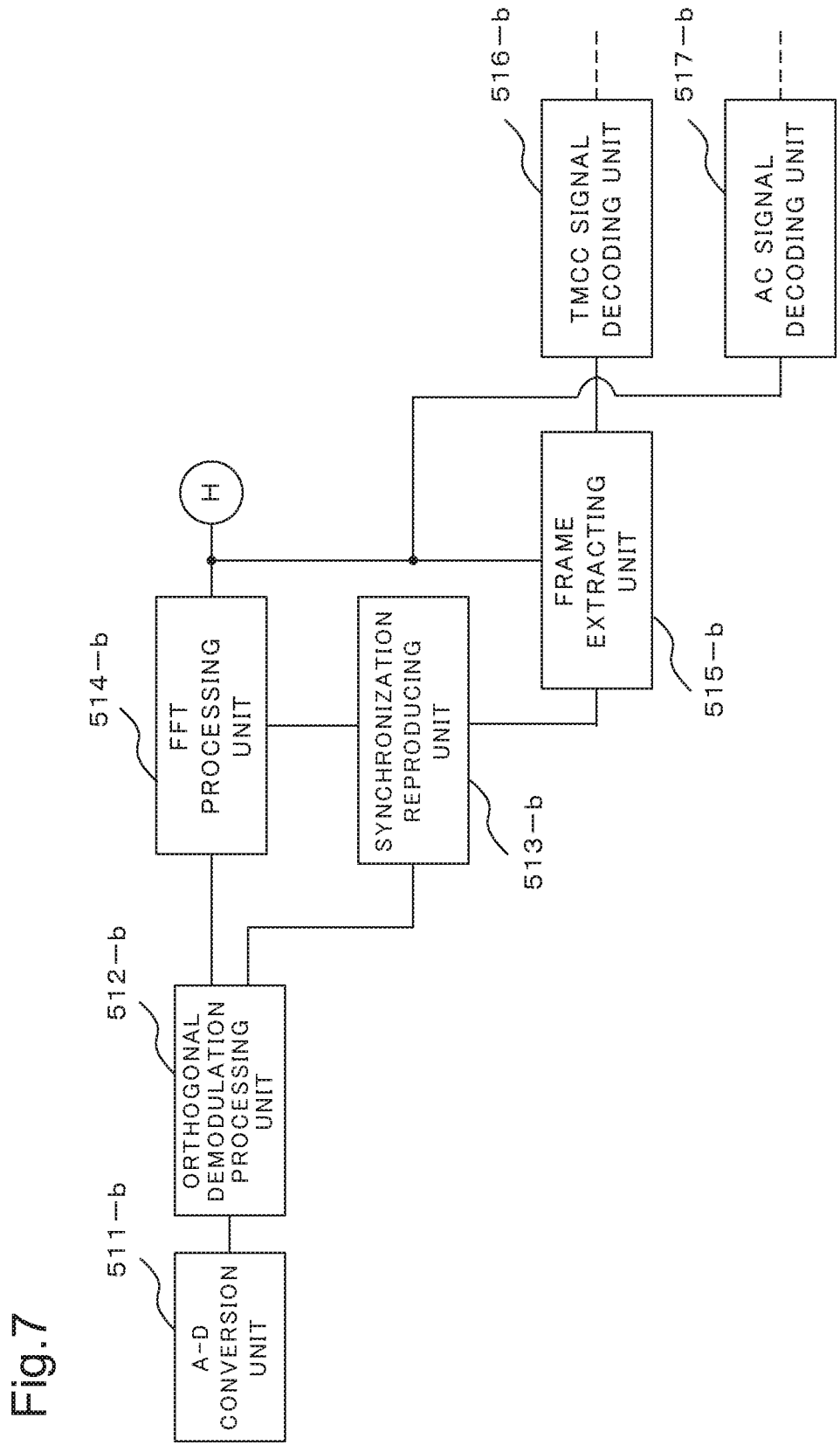
FIG. 7 is a block diagram illustrating a configuration of the demodulation unit according to the first example embodiment.
Figure 8:
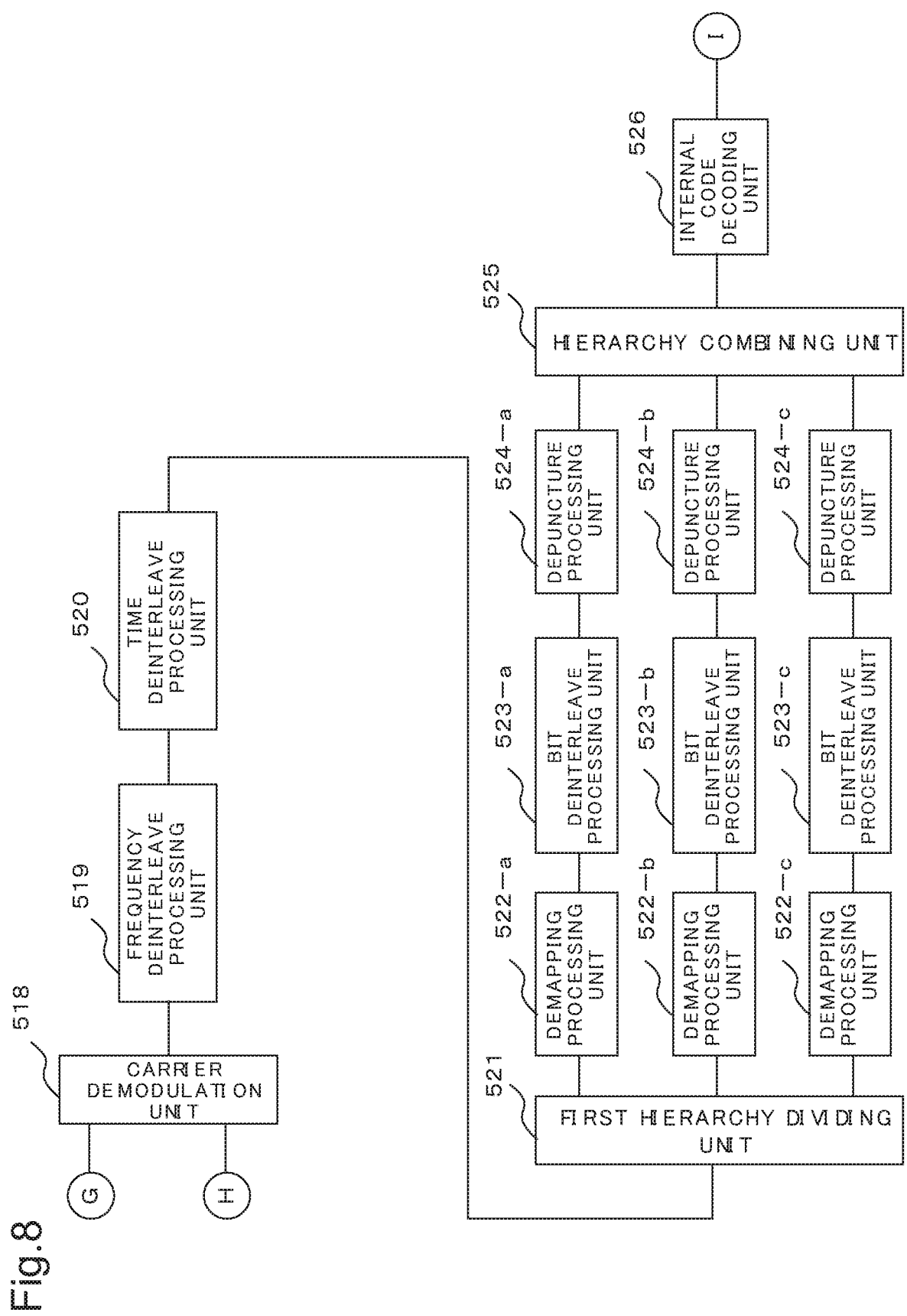
FIG. 8 is a block diagram illustrating a configuration of the demodulation unit according to the first example embodiment.
Figure 9:
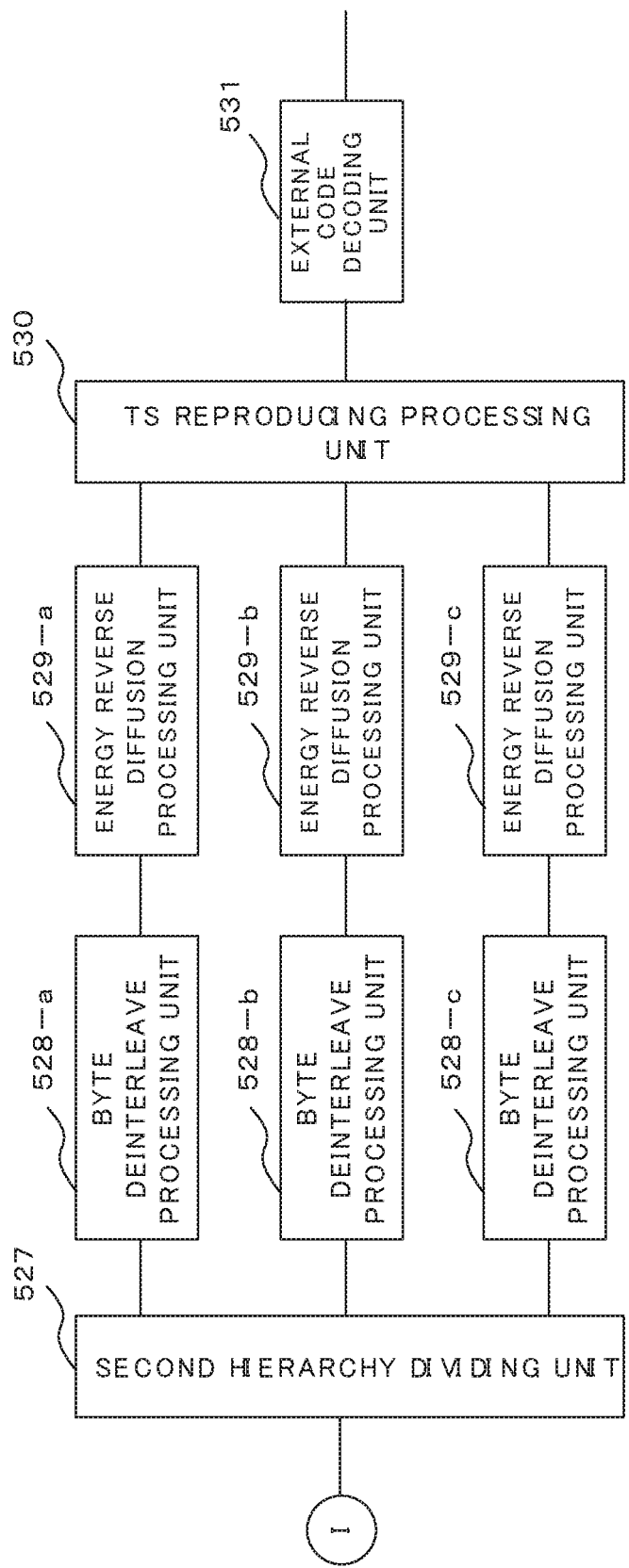
FIG. 9 is a block diagram illustrating a configuration of the demodulation unit according to the first example embodiment.

Herein, a transmission method is described with reference to a drawing. FIG. 5 is an explanatory diagram illustrating an example of a transmission method according to the present example embodiment. In the present example, a frequency band according to data transmission between the transmitting unit 200, and the receiving units 300 and 400 is used by dividing the frequency band into thirteen segments.

Further, in the frequency band in horizontal polarization, seven segments constituted by first to third segments, and tenth to thirteenth segments from the lowest frequency are used for data transmission according to a 2K signal, and are referred to as a C-hierarchy. In FIG. 5, the C-hierarchy is indicated by a hatched portion of right down oblique lines.

Further, in the frequency band in horizontal polarization, five segments constituted by fourth to sixth segments, and eighth and ninth segments from the lowest frequency are used for data transmission according to a 4K signal, and are referred to as a B-hierarchy. In FIG. 5, the B-hierarchy is indicated by a hatched portion of left down oblique lines.

In the frequency band in horizontal polarization, a seventh segment from the lowest frequency is used for data transmission according to a one-segment signal, and is referred to as an A-hierarchy. In FIG. 5, the A-hierarchy is indicated by a mesh portion.

Further, in the frequency band in vertical polarization, five segments constituted by fourth to sixth segments, and eighth and ninth segments from the lowest frequency are also used for data transmission according to a 4K signal, and are also referred to as a B-hierarchy.

Therefore, ten segments, namely, five segments in horizontal polarization and five segments in vertical polarization in total, are used for data transmission according to a 4K signal.

In the present example, data according to a one-segment signal to be transmitted by using the A-hierarchy are input to the first byte-bit conversion unit 263-*a*. Further, data according to a 4K signal to be transmitted by using the B-hierarchy are input to the first byte-bit conversion unit 263-*b*. Furthermore, data according to a 2K signal to be transmitted by using the C-hierarchy are input to the first byte-bit conversion unit 263-*c*.

Herein, it is assumed that data are input in a byte unit to the first byte-bit conversion units 263-*a* to 263-*c*. In view of the above, the first byte-bit conversion units 263-*a* to 263-*c* respectively convert input data in a byte unit into bitstreams in the order of most significant bit (MSB) first.

Further, the first byte-bit conversion units 263-*a* to 263-*c* respectively input the bitstreams after conversion to the energy diffusion units 264-*a* to 264-*c*.

The energy diffusion units 264-*a* to 264-*c* apply predetermined energy diffusion processing to the bitstreams input by the first byte-bit conversion units 263-*a* to 263-*c*. Specifically, the energy diffusion units 264-*a* to 264-*c* respectively calculate an exclusive OR in a bit unit by, for example, a predetermined pseudo-random binary sequence (PRBS), and a bit sequence except for a synchronous byte in the bitstreams input by the first byte-bit conversion units 263-*a* to 263-*c*. Further, the energy diffusion units 264-*a* to 264-*c* input, to the delay correction units 265-*a* to 265-*c*, respective calculation results, as a result of applying energy diffusion processing to the respective bitstreams input by the first byte-bit conversion units 263-*a* to 263-*c*.

The delay correction units 265-*a* to 265-*c* apply delay correction processing, as necessary, to the input bitstreams in such a way that processing end timings in the transmitting unit 200 for the one-segment signal, the 2K signal, and the 4K signal coincide with one another. Further, the delay correction units 265-*a* to 265-*c* respectively input, to the bit-byte conversion units 266*a*- to 266-*c*, the bitstreams after a processing result.

The bit-byte conversion units 266*a*- to 266-*c* convert the input bit-unit data into byte-unit data in the order of MSB first.

The byte interleave processing units 267-*a* to 267-*c* apply convolutional byte interleave processing of differentiating mutual delay amounts among the respective pieces of byte-unit data converted by the bit-byte conversion units 266-*a* to 266-*c*. Note that a depth of interleave is, for example, 12 bytes.

The second byte-bit conversion units 268-*a* to 268-*c* convert, into bitstreams in the order of MSB first, input data in a byte unit to which convolutional byte interleave processing is applied by the byte interleave processing units 267-*a* to 267-*c*.

The convolutional encoding processing units 269-*a* to 269-*c* respectively apply predetermined convolutional encoding processing to the bitstreams, which are respectively applied convolutional byte interleave processing by the second byte-bit conversion units 268-*a* to 268-*c*. Specifically, the convolutional encoding processing units 269-*a* to 269-*c* apply punctured convolutional code encoding processing to the bitstreams, for example, at an encoding rate respectively set for each of the hierarchies, namely, at encoding rates respectively set by the convolutional encoding processing units 269-*a* to 269-*c*, by using an original code having a constraint length=7 and an encoding rate 1/2, as a mother code.

The bit interleave processing units 270-*a* to 270-*c* apply, to the bitstreams to which encoding processing is applied, bit interleave processing according to mapping to be performed by the mapping processing units 271-*a* to 271-*c* at a later stage. Specifically, for example, it is assumed that the mapping processing unit 271-*a* applies mapping processing of quadrature phase shift keying (QPSK) on a bitstream based on a one-segment signal where encoding processing is applied by the convolutional encoding processing unit 269-*a*. In view of this, the bit interleave processing unit 270-*a* applies, to the bitstream based on the one-segment signal, bit interleave processing of inserting, for example, a delay element of 120 bits. Further, it is assumed that the mapping processing unit 271-*b* applies mapping processing of 4096 quadrature amplitude modulation (QAM), 1024QAM, 256QAM, or the like on a bitstream based on a 4K signal where encoding processing is applied by the convolutional encoding processing unit 269-*b*. In view of this, the bit interleave processing unit 270-*b* applies, to the bitstream based on the 4K signal, bit interleave processing of inserting, for example, a delay element of a bit number according to the mapping processing. It is assumed that the mapping processing unit 271-*c* applies mapping processing of 64QAM or the like on a bitstream based on a 2K signal where encoding processing is applied by the convolutional encoding processing unit 269-*c*. In view of this, the bit interleave processing unit 270-*b* applies, to the bitstream based on the 2K signal, bit interleave processing of inserting, for example, a delay element of 24 to 120 bits.

The mapping processing units 271-*a* to 271-*c* perform mapping processing on bitstreams to which bit interleave processing is applied by the bit interleave processing units 270-*a* to 270-*c*. Specifically, the mapping processing unit 271-*a*, for example, applies mapping processing of QPSK on a bitstream based on a one-segment signal where bit interleave processing is applied by the bit interleave processing unit 270-*a*. Further, the mapping processing unit 271-*b*, for example, applies mapping processing of 4096QAM, 1024QAM, 256QAM, or the like on a bitstream based on a 4K signal where bit interleave processing is applied by the bit interleave processing unit 270-*b*. The mapping processing unit 271-*c*, for example, applies mapping processing of 64QAM, or the like on a bitstream based on a 2K signal where bit interleave processing is applied by the bit interleave processing unit 270-*c*. Further, the mapping processing units 271-*a* to 271-*c* respectively input, to the hierarchy combining unit 272, a signal on which the bitstream based on the one-segment signal is mapped, a signal on which the bitstream based on the 4K signal is mapped, and a signal on which the bitstream based on the 2K signal is mapped.

The hierarchy combining unit 272 performs hierarchy combining processing of combining the signals respectively input by the mapping processing units 271-*a* to 271-*c* by using a prescribed parameter, inserting into a data segment, and performing speed conversion. Note that it is assumed that there are prepared one data segment according to a A-hierarchy (in other words, a one-segment signal), ten data segments according to a B-hierarchy (in other words, a 4K signal), and seven data segments according to a C-hierarchy (in other words, a 2K signal).

The time interleave processing unit 273 applies predetermined time interleave processing to the signals to which hierarchy combining processing is applied in modulation symbol units (in I-axis unit and Q-axis unit), in order to improve fading resistance by timewisely dispersing symbol data after modulation (mapping processing).

The frequency interleave processing unit 274 performs frequency interleave processing of changing (rotating) a frequency of a carrier (carrier wave) within the above-described thirteen segments according to time, or exchanging a frequency band to be used among the segments. Note that, regarding a segment based on a one-segment signal, for example, inter-segment interleave processing of exchanging a frequency band with respect to another segment may not be performed.

A signal to which frequency interleave processing is applied by the frequency interleave processing unit 274, a pilot signal, a transmission and multiplexing configuration control (TMCC) signal, and an auxiliary channel (AC) signal are input to the OFDM frame configuration unit 275. Note that the pilot signal is, for example, a sequential carrier. Further, the TMCC signal is, for example, a signal for transmitting control information. For example, it is assumed that the TMCC signal includes information indicating a synchronous byte of a TS packet. The AC signal is, for example, an extension signal for transmitting appended information relating to broadcasting.

Further, the OFDM frame configuration unit 275 configures an OFDM frame, based on each of the input signals. Specifically, the OFDM frame configuration unit 275 sets, to each symbol in each carrier of an OFDM, a value of each signal (a one-segment signal, a 2K signal, a 4K signal, a pilot signal, a TMCC signal, and an AC signal), for example.

Note that the OFDM frame configuration unit 275 configures an OFDM frame for horizontal polarization, and an OFDM frame for vertical polarization, for example. Specifically, the OFDM frame configuration unit 275 configures an OFDM frame for horizontal polarization according to a signal associated with a segment according to a one-segment signal, a signal associated with a segment according to a 2K signal, a signal associated with five segments among ten segments according to a 4K signal, a pilot signal, a TMCC signal, and an AC signal, for example. Further, the OFDM frame configuration unit 275 configures an OFDM frame for vertical polarization according to a signal associated with the remaining five segments among the ten segments according to the 4K signal, a pilot signal, a TMCC signal, and an AC signal, for example. Note that each of the pilot signals is inserted at a position in a frequency domain, which is set in such a way that appropriate reception of a broadcast wave in the C-hierarchy is enabled, even when a broadcast wave with polarization MIMO is configured to be transmitted to the B-hierarchy, as described in the present example.

Further, the OFDM frame configuration unit 275 inputs the OFDM frame for horizontal polarization to the normalization unit 276-*a*, for example. Furthermore, the OFDM frame configuration unit 275 inputs the OFDM frame for vertical polarization to the normalization unit 276-*b*, for example.

The normalization units 276-*a* and 276-*b* apply normalization processing, to each of the input OFDM frames, in such a way that transmission signal levels of carriers are equalized, and a ratio between average powers of OFDM symbols becomes 1 without depending on a modulation method. Further, the normalization units 276-*a* and 276-*b* respectively input, to the IFFT processing units 277-*a* and 277-*b*, the OFDM frames to which normalization processing is applied.

The IFFT processing units 277-*a* and 277-*b* respectively apply IFFT processing to each of the input OFDM frames, and convert a frequency domain signal into a time domain signal. Further, the IFFT processing units 277-*a* and 277-*b* respectively input, to the guard interval appending processing units 278-*a* and 278-*b*, the time domain signals after conversion.

The guard interval appending processing units 278-*a* and 278-*b* apply, to the input time domain signals, guard interval processing of appending data corresponding to a predetermined time before valid symbols in the time domain signals.

The orthogonal modulation processing units 279-*a* and 279-*b* apply predetermined orthogonal modulation processing to the time domain signals input by the guard interval appending processing units 278-*a* and 278-*b*. Specifically, the orthogonal modulation processing unit 279-*a* applies predetermined orthogonal modulation processing to the time domain signal input by the guard interval appending processing unit 278-*a*, and converts the time domain signal into a first OFDM signal of a predetermined transmission frequency, for example. Further, the orthogonal modulation processing unit 279-*a* inputs the first OFDM signal to the first amplification unit 240. Meanwhile, the orthogonal modulation processing unit 279-*b* applies predetermined orthogonal modulation processing to the time domain signal input by the guard interval appending processing unit 278-*b*, and converts the time domain signal into a second OFDM signal of a predetermined transmission frequency, for example. Further, the orthogonal modulation processing unit 279-*b* inputs the second OFDM signal to the second amplification unit 250.

Next, a configuration of the demodulation unit 430 is described with reference to the drawings. FIGS. 6 to 9 are block diagrams illustrating a configuration of the demodulation unit 430 according to the first example embodiment of the present invention.

As illustrated in FIGS. 6 to 9, the demodulation unit 430 according to the first example embodiment of the present invention includes analog to digital (A-D) conversion units 511-*a* and 511-*b*, orthogonal demodulation processing units 512-*a* and 512-*b*, synchronization reproducing units 513-*a* and 513-*b*, fast Fourier transform (FFT) processing units 514-*a* and 514-*b*, frame extracting units 515-*a* and 515-*b*, TMCC signal decoding units 516-*a* and 516-*b*, AC signal decoding units 517-*a* and 517-*b*, a carrier demodulation unit 518, a frequency deinterleave processing unit 519, a time deinterleave processing unit 520, a first hierarchy dividing unit 521, demapping processing units 522-*a* to 522-*c*, bit deinterleave processing units 523-*a* to 523-*c*, depuncture processing units 524-*a* to 524-*c*, a hierarchy combining unit 525, an internal code decoding unit 526, a second hierarchy dividing unit 527, byte deinterleave processing units 528-*a* to 528-*c*, energy reverse diffusion processing units 529-*a* to 529-*c*, a TS reproducing processing unit 530, and an external code decoding unit 531.

Reception signals to which predetermined processing is applied by the first reception processing unit 410 and the second reception processing unit 420 are respectively input to the A-D conversion units 511-*a* and 511-*b*. Specifically, a reception signal to which predetermined processing is applied by the first reception processing unit 410 is input to the A-D conversion unit 511-*a*, for example. Further, the A-D conversion unit 511-*a* converts the reception signal being an input analog signal into a digital signal. Furthermore, the A-D conversion unit 511-*a* inputs the reception signal being the converted digital signal to the orthogonal demodulation processing unit 512-*a*.

Meanwhile, a reception signal to which predetermined processing is applied by the second reception processing unit 420 is input to the A-D conversion unit 511-*b*, for example. Further, the A-D conversion unit 511-*b* converts the reception signal being an input analog signal into a digital signal. Furthermore, the A-D conversion unit 511-*b* inputs the reception signal being the converted digital signal to the orthogonal demodulation processing unit 512-*b*.

Further, the orthogonal demodulation processing units 512-*a* and 512-*b* apply predetermined orthogonal demodulation processing to the input reception signals. Specifically, the orthogonal demodulation processing units 512-*a* and 512-*b* respectively combine the input reception signal and a demodulation signal orthogonal thereto, and acquire an I component signal and a Q component signal.

Furthermore, these signals being the reception signals after orthogonal demodulation processing are respectively input to the synchronization reproducing units 513-*a* and 513-*b*, and to the FFT processing units 514-*a* and 514-*b*.

The synchronization reproducing units 513-*a* and 513-*b* reproduce OFDM symbol synchronization and FFT sample frequencies, based on signals input by the orthogonal demodulation processing units 512-*a* and 512-*b*, signals to which FFT processing is applied by the FFT processing units 514-*a* and 514-*b*, and frame synchronization signals extracted by the frame extracting units 515-*a* and 515-*b*, according to a mode (in the present example mode 3) depending on the number of carriers in an OFDM, and according to a guard interval length. Specifically, the synchronization reproducing units 513-*a* and 513-*b* specify (reproduce) timings for synchronizing OFDM symbols and FFT sample frequencies, based on the signals input from each of the units, for example.

The FFT processing units 514-*a* and 514-*b* apply FFT processing to the signals input by the orthogonal demodulation processing units 512-*a* and 512-*b*, based on information reproduced by the synchronization reproducing units 513-*a* and 513-*b*, and convert the time domain signals input by the orthogonal demodulation processing units 512- and 512-*b* into frequency domain signals. Further, the FFT processing units 514-*a* and 514-*b* inputs the frequency domain signals after conversion to the synchronization reproducing units 513-*a* and 513-*b*, the frame extracting units 515-*a* and 515-*b*, and the AC signal decoding units 517-*a* and 517-*b*.

The frame extracting units 515-*a* and 515-*b* extract the frame synchronization signals from the frequency domain signals input by the FFT processing units 514-*a* and 514-*b*. Further, the frame extracting units 515-*a* and 515-*b* input the extracted frame synchronization signals to the synchronization reproducing units 513-*a* and 513-*b*, and the TMCC signal decoding units 516-*a* and 516-*b*. Note that the frame extracting units 515-*a* and 515-*b* also input, to the TMCC signal decoding units 516-*a* and 516-*b*, the frequency domain signals input by the FFT processing units 514-*a* and 514-*b*.

The TMCC signal decoding units 516-*a* and 516-*b* extracts TMCC information from a TMCC signal among the frequency domain signals output from the FFT processing units 514-*a* and 514-*b*. Further, the TMCC signal decoding units 516-*a* and 516-*b* input the extracted TMCC information to the carrier demodulation unit 518, the frequency deinterleave processing unit 519, the time deinterleave processing unit 520, the first hierarchy dividing unit 521, the demapping processing units 522-*a* to 522-*c*, the bit deinterleave processing units 523-*a* to 523-*c*, the depuncture processing units 524-*a* to 524-*c*, the hierarchy combining unit 525, the second hierarchy dividing unit 527, and the TS reproducing processing unit 530.

The AC signal decoding units 517-*a* and 517-*b* extract an AC signal from the frequency domain signals input by the FFT processing units 514-*a* and 514-*b*. Further, the AC signal decoding units 517-*a* and 517-*b* extract earthquake motion alarm information, when configuration identification in the AC signal indicates transmission of earthquake motion alarm information.

The frequency domain signals converted by the FFT processing units 514-*a* and 514-*b* are respectively input to the carrier demodulation unit 518. In view of this, the carrier demodulation unit 518 applies differential demodulation processing or synchronization demodulation processing to the frequency domain signals input by the FFT processing units 514-*a* and 514-*b*, based on the TMCC information input by the TMCC signal decoding units 516-*a* and 516-*b* (or by either one of the TMCC signal decoding unit 516-*a* or the TMCC signal decoding unit 516-*b*). Specifically, the carrier demodulation unit 518 specifies each carrier constituting an OFDM signal, based on an OFDM segment in the frequency domain signals input by the FFT processing units 514-*a* and 514-*b*, and generates amplitude information indicating an amplitude of each carrier, and phase information indicating a phase of each carrier. Further, the carrier demodulation unit 518 inputs, to the frequency deinterleave processing unit 519, the frequency domain signals converted by the FFT processing units 514-*a* and 514-*b*, the amplitude information, and the phase information.

The frequency deinterleave processing unit 519 applies, to the frequency domain signals converted by the FFT processing units 514-*a* and 514-*b*, frequency deinterleave processing of returning a frequency of each carrier, which is changed by frequency interleave processing applied by the frequency interleave processing unit 274, or a frequency band, which is exchanged with respect to another exchanged segment, based on each piece of the information input by the carrier demodulation unit 518.

The time deinterleave processing unit 520 applies, to the signals to which frequency deinterleave processing is applied by the frequency deinterleave processing unit 519, time deinterleave processing of returning, to an original timewise order, symbol data which are timewisely dispersed by time interleave processing applied by the time interleave processing unit 273.

The first hierarchy dividing unit 521 divides the signals to which time deinterleave processing is applied by the time deinterleave processing unit 520 into signals according to each of the hierarchies, based on the TMCC information input by the TMCC signal decoding units 516-*a* and 516-*b* (or by either one of the TMCC signal decoding unit 516-*a* or the TMCC signal decoding unit 516-*b*). Specifically, among signals to which time deinterleave processing is applied by the time deinterleave processing unit 520, the first hierarchy dividing unit 521 inputs a carrier signal in a frequency band according to the A-hierarchy to the demapping processing unit 522-*a*, inputs a carrier signal in a frequency band according to the B-hierarchy to the demapping processing unit 522-*b*, and inputs a carrier signal in a frequency band according to the C-hierarchy to the demapping processing unit 522-*c*.

The demapping processing unit 522-*a* applies, to the signal input by the first hierarchy dividing unit 521, demapping processing according to mapping processing applied by the mapping processing unit 271-*a*, based on the TMCC information input by the TMCC signal decoding units 516-*a* and 516-*b* (or by either one of the TMCC signal decoding unit 516-*a* or the TMCC signal decoding unit 516-*b*). In the present example, the mapping processing unit 271-*a* applies mapping processing of QPSK to the carrier signal in the frequency band according to the A-hierarchy. In view of this, the demapping processing unit 522-*a* applies demapping processing according to QPSK to the signal input by the first hierarchy dividing unit 521, and extracts bit information (bitstream).

The demapping processing unit 522-*b* applies, to the signal input by the first hierarchy dividing unit 521, demapping processing according to mapping processing applied by the mapping processing unit 271-*b*, based on the TMCC information input by the TMCC signal decoding units 516-*a* and 516-*b* (or by either one of the TMCC signal decoding unit 516-*a* or the TMCC signal decoding unit 516-*b*). In the present example, the mapping processing unit 271-*b* applies mapping processing of 4096QAM, 1024QAM, 256QAM, or the like to the carrier signal in the frequency band according to the B-hierarchy. In view of this, the demapping processing unit 522-*b* applies demapping processing according to those mapping processing to the signal input by the first hierarchy dividing unit 521, and extracts bit information (bitstream).

The demapping processing unit 522-*c* applies, to the signal input by the first hierarchy dividing unit 521, demapping processing according to mapping processing applied by the mapping processing unit 271-*c*, based on the TMCC information input by the TMCC signal decoding units 516-*a* and 516-*b* (or by either one of the TMCC signal decoding unit 516-*a* or the TMCC signal decoding unit 516-*b*). In the present example, the mapping processing unit 271-*c* applies mapping processing of 64QAM or the like to the carrier signal in the frequency band according to the C-hierarchy. In view of this, the demapping processing unit 522-*c* applies demapping processing according to 64QAM or the like to the signal input by the first hierarchy dividing unit 521, and extracts bit information (bitstream).

The bit deinterleave processing unit 523-*a* applies, to the bitstream extracted by the demapping processing unit 522-*a*, bit deinterleave processing according to bit interleave processing applied by the bit interleave processing unit 270-*a*. Specifically, in the present example, the bit interleave processing unit 270-*a* applies bit interleave processing of inserting a delay element of 120 bits into a bitstream based on a one-segment signal, for example. In view of this, for example, the bit deinterleave processing unit 523-*a* performs bit deinterleave processing of erasing the delay element of 120 bits from the bitstream extracted by the demapping processing unit 522-*a*, for example.

The bit deinterleave processing unit 523-*b* applies, to the bitstream extracted by the demapping processing unit 522-*b*, bit deinterleave processing according to bit interleave processing applied by the bit interleave processing unit 270-*b*. Specifically, in the present example, the bit interleave processing unit 270-*b* applies bit interleave processing of inserting a delay element of a bit number according to mapping processing by the mapping processing unit 271-*b* into a bitstream based on a 4K signal, for example. In view of this, for example, the bit deinterleave processing unit 523-*b* performs bit deinterleave processing of erasing the delay element from the bitstream extracted by the demapping processing unit 522-*b*, for example.

The bit deinterleave processing unit 523-*c* applies, to the bitstream extracted by the demapping processing unit 522-*c*, bit deinterleave processing according to bit interleave processing applied by the bit interleave processing unit 270-*c*. Specifically, in the present example, the bit interleave processing unit 270-*c* applies bit interleave processing of inserting a delay element of 24 to 120 bits according to mapping processing by the mapping processing unit 271-*c* into a bitstream based on a 2K signal, for example. In view of this, for example, the bit deinterleave processing unit 523-c performs bit deinterleave processing of erasing the delay element from the bitstream extracted by the demapping processing unit 522-c, for example.

The depuncture processing units 524-a to 524-c perform bit interpolation of a convolutional code according to a convolutional encoding rate, which is specified by the TMCC information input by the TMCC signal decoding units 516-a and 516-b (or by either one of the TMCC signal decoding unit 516-a or the TMCC signal decoding unit 516-b). Note that it is assumed that an encoding rate for each hierarchy is indicated by the TMCC information. In view of this, the depuncture processing unit 524-a performs bit interpolation of a convolutional code according to an encoding rate of the A-hierarchy indicated by the TMCC information. Further, the depuncture processing unit 524-b performs bit interpolation of a convolutional code according to an encoding rate of the B-hierarchy indicated by the TMCC information. Furthermore, the depuncture processing unit 524-c performs bit interpolation of a convolutional code according to an encoding rate of the C-hierarchy indicated by the TMCC information.

The hierarchy combining unit 525 combines the bitstreams of the hierarchies in which the bits are respectively interpolated by the depuncture processing units 524-a to 524-c.

The internal code decoding unit 526 applies decoding processing to the bitstream to which bit interpolation is performed by the depuncture processing units 524-a to 524-c and then which is combined by the hierarchy combining unit 525. Specifically, the internal code decoding unit 526 applies decoding processing based on a Viterbi algorithm to the bitstream, for example.

The second hierarchy dividing unit 527 divides the bitstream to which decoding processing is applied by the internal code decoding unit 526, into bitstreams according to each of the hierarchies, based on the TMCC information input by the TMCC signal decoding units 516-a and 516-b. Specifically, for example, the second hierarchy dividing unit 527 configures a bitstream by bits according to the A-hierarchy among the bitstreams to which decoding processing is applied, and inputs the bitstream to the byte deinterleave processing unit 528-a. Further, the second hierarchy dividing unit 527 configures a bitstream by bits according to the B-hierarchy among the bitstreams to which decoding processing is applied, and inputs the bitstream to the byte deinterleave processing unit 528-b, for example. Furthermore, the second hierarchy dividing unit 527 configures a bitstream by bits according to the C-hierarchy among the bitstreams to which decoding processing is applied, and inputs the bitstream to the byte deinterleave processing unit 528-c, for example.

The byte deinterleave processing units 528-a to 528-c convert the input bit-unit data (bitstreams) into byte-unit data. Further, the byte deinterleave processing units 528-a to 528-c apply, to the data, byte deinterleave processing of resetting delay amounts, which are set by applying convolutional byte interleave processing by the byte interleave processing units 267-a to 267-c, for example.

The energy reverse diffusion processing units 529-a to 529-c convert the byte-unit data to which byte deinterleave processing is applied by the byte deinterleave processing units 528-a to 528-c into bitstreams in a bit unit, and apply energy reverse diffusion processing to the bitstreams after conversion. Specifically, the energy reverse diffusion processing units 529-a to 529-c respectively calculate an exclusive OR in a bit unit by a bit string except for a synchronous byte of a TS packet among the bitstreams, and a predetermined PRBS used in energy diffusion processing by the energy diffusion processing units 264-a to 264-c, for example. Further, the energy reverse diffusion processing units 529-a to 529-c input, to the TS reproducing processing unit 530, data on the respective calculation results, as a result of application of energy reverse diffusion processing.

The TS reproducing processing unit 530 reproduces a TS frame configuration similar to that on a transmission side by multiplexing the input pieces of data each other and dividing into TS packets, by referring to TS synchronous bytes, based on the TMCC information input by the TMCC signal decoding units 516-a and 516-b (or by either one of the TMCC signal decoding unit 516-a or the TMCC signal decoding unit 516-b).

The external code decoding unit 531 applies, to the TS packet having the TS frame configuration reproduced by the TS reproducing processing unit 530, decoding processing of detecting and correcting an error, based on a predetermined code for inspection appended by the external code processing units 261-a and 261-b, and generates a TS packet.

The TS packet generated by the external code decoding unit 531 is converted into a video signal by the decoding unit 440, and a video is reproduced by a video display apparatus or the like.

Note that the reception signal received by the antenna 601 for horizontal polarization via the distributor 700 is also input to the receiving unit 300. Further, the receiving unit 300 reproduces, on a television receiver, the video according to the input reception signal, based on a transmission method for current terrestrial digital television broadcasting, for example.

Therefore, a video based on a 4K signal is reproduced on a video display apparatus or the like connected to the receiving unit 400 according to the first example embodiment of the present invention. Further, a video based on a transmission method for current terrestrial digital television broadcasting is reproduced on a television receiver connected to the receiving unit 300 according to a 2K signal. Therefore, the broadcast system 100 according to the first example embodiment of the present invention can coexist with a broadcast system of current terrestrial digital television broadcasting.

Figure 10:
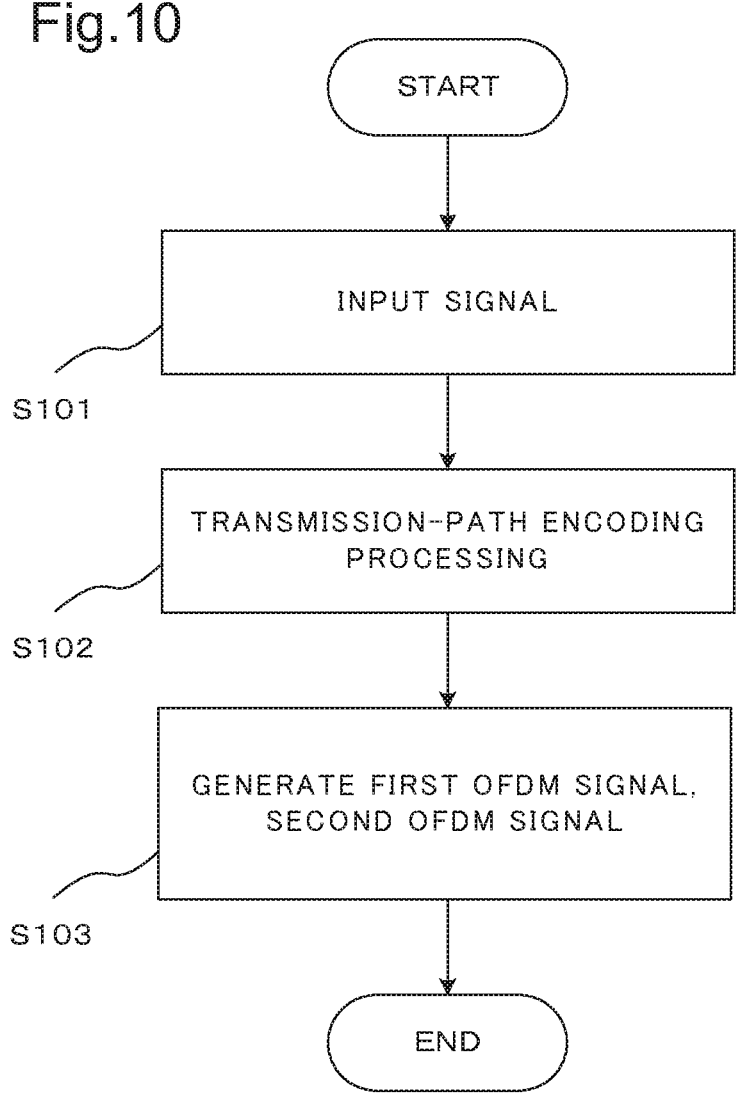
FIG. 10 is a flowchart illustrating an operation of the modulation unit according to the first example embodiment.

Next, an operation of the transmitting unit 200 in the first example embodiment of the present invention is described. FIG. 10 is a flowchart illustrating an operation of the modulation unit 230 according to the first example embodiment of the present invention. As illustrated in FIG. 10, first, a one-segment signal, a 2K signal, and a 4K signal are input to the modulation unit 230 (Step S101). Then, each unit of the modulation unit 230 combines the input one-segment signal, 2K signal, and 4K signal, and applies transmission-path encoding processing thereto (Step S102). Then, the modulation unit 230 generates a first OFDM signal for an electromagnetic wave to be transmitted by the antenna 501 for horizontal polarization, and a second OFDM signal for an electromagnetic wave to be transmitted by the antenna 502 for vertical polarization (Step S103).

According to the present example embodiment, the modulation unit 230 of the transmitting unit 200 generates two types of OFDM transmission signals, based on the input 2K signal and 4K signal, the OFDM transmission signals being transmittable by differentiating polarization planes thereof. Further, the demodulation unit 430 of the receiving unit 400 demodulates a reception signal based on the OFDM transmission signals generated and transmitted by the transmitting unit 200, and generates a TS packet convertible into a 2K signal and a 4K signal by the decoding unit 440.

Therefore, it is possible to transmit data in such a way that at least one of a video according to a one-segment signal, a video according to a 2K signal, and a video according to a 4K signal can be reproduced on a reception side, by using an electromagnetic wave used in transmission of current terrestrial digital television broadcasting and an electromagnetic wave having a polarization plane different from a polarization plane of the former electromagnetic wave.

Further, when a polarization plane of an electromagnetic wave according to a 2K signal is set in a same way as a polarization plane of an electromagnetic wave used in transmission of current terrestrial digital television broadcasting, it is possible to newly reproduce a video according to a 4K signal, while maintaining, on a reception side, a state that current terrestrial digital television broadcasting can be received and a video can be reproduced.

Note that, in the foregoing example, description is made based on a premise that ten segments (five segments for horizontal polarization, and five segments for vertical polarization, namely, ten segments in total) are used by the B-hierarchy where data according to a 4K signal are transmitted and received. Alternatively, it may be configured in such a way that segments of a number other than the above such as eight segments (four segments for horizontal polarization and four segments for vertical polarization, namely, eight segments in total) are used by the B-hierarchy where data according to a 4K signal are transmitted and received.

FIG. 11 is an explanatory diagram illustrating an example of parameters according to a number of segments to be used by the B-hierarchy, and a modulation method of a 4K signal.

In the example illustrated in FIG. 11, values according to current terrestrial digital television broadcasting are illustrated in a 2K column. Further, in 4K columns, a TS rate for each modulation method is illustrated regarding a case that four segments are used and a case that five segments are used in each of the B-hierarchy and the C-hierarchy.

As illustrated in FIG. 11, the larger a multi-valued number for a 4K modulation method is, a value of a TS rate increases. Further, as illustrated in FIG. 11, the larger a number of segments for use in data transmission according to a 4K signal is, a value of a TS rate for data transmission according to a 4K signal increases. Likewise, as illustrated in FIG. 11, the larger a number of segments for use in data transmission according to a 2K signal is, a value of a TS rate for data transmission according to a 2K signal increases.

Note that, in the foregoing example, description is made based on a premise that one of signals is for horizontal polarization, and the other of the signals is for vertical polarization. Alternatively, one of signals may be for vertical polarization, and the other of the signals may be for horizontal polarization.

Further, in the present example, description is made based on a premise that a one-segment signal, a 2K signal, and a 4K signal are each a TS. Alternatively, a one-segment signal, a 2K signal, and a 4K signal may be signals of another format, such as a signal according to a packet of an MPEG media transport (MMT) method.

Furthermore, in the present example, the receiving units 300 and 400 are configured in such a way as to share the antenna 601 for horizontal polarization. Alternatively, individual antennas may be connected respectively to the receiving units 300 and 400.

Second Example Embodiment

Figure 12:
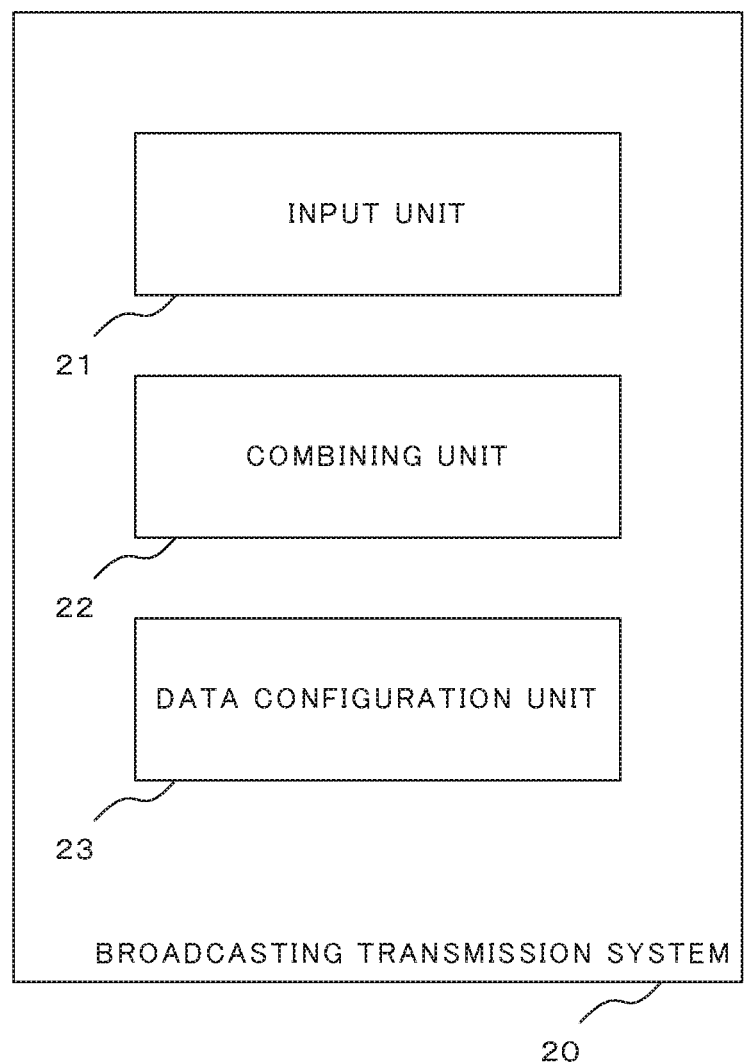
FIG. 12 is a block diagram illustrating a configuration example of a broadcasting transmission system according to a second example embodiment.

A broadcasting transmission system according to a second example embodiment of the present invention is described with reference to a drawing. FIG. 12 is a block diagram illustrating a configuration example of a broadcasting transmission system 20 according to the second example embodiment of the present invention. As illustrated in FIG. 12, the broadcasting transmission system 20 according to the second example embodiment of the present invention includes an input unit 21, a combining unit 22, and a data configuration unit 23. The input unit 21 corresponds to, for example, the encoding unit 210 according to the first example embodiment of the present invention. The combining unit 22 corresponds to, for example, the hierarchy combining unit 272 according to the first example embodiment of the present invention. The data configuration unit 23 corresponds to, for example, the OFDM frame configuration unit 275 according to the first example embodiment of the present invention.

The input unit 21 receives data for ordinary quality image reproduction according to terrestrial digital television broadcasting, and data for high quality image reproduction.

The combining unit 22 combines the data for the ordinary quality image reproduction and the data for the high quality image reproduction.

Further, the data configuration unit 23 generates transmission data for one of polarized antennas, and transmission data for the other of the polarized antennas, based on the combined data acquired by combining the data for the ordinary quality image reproduction and the data for the high quality image reproduction.

According to the present example embodiment, the combining unit 22 combines data for ordinary quality image reproduction according to terrestrial digital television broadcasting, and data for high quality image reproduction. Further, the data configuration unit 23 generates transmission data for one of polarized antennas, and transmission data for the other of the polarized antennas, based on the combined data.

Therefore, it is possible to provide novel terrestrial broadcasting system that can coexist with terrestrial digital television broadcasting.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-031919, filed on Feb. 23, 2017, the disclosure of which is incorporated herein in its entirety by reference.

REFERENCE SIGNS LIST

20 Broadcasting transmission system
21 Input unit
22 Combining unit
23 Data configuration unit
100 Broadcast system
200 Transmitting unit
210 Encoding unit
211 First encoder
212 Second encoder
213 Third encoder
220 Multiplexing unit
230 Modulation unit
240 First amplification unit
250 Second amplification unit 300, 400 Receiving unit
410 First reception processing unit
420 Second reception processing unit
430 Demodulation unit
440 Decoding unit
501, 502, 601, 602 Antenna
700 Distributor
261-a, 262-b External code processing unit
261-b Frame configuration unit
262-a Hierarchy dividing unit
263-a, 263-b, 263-c First byte-bit conversion unit
264-a, 264-b, 264-c Energy diffusion unit
265-a, 265-b, 265-c Delay correction unit
266a, 266-b, 266-c Bit-byte conversion unit
267-a, 267-b, 267-c Byte interleave processing unit
268-a, 268-b, 268-c Second byte-bit conversion unit
269-a, 269-b, 269-c Convolutional encoding processing unit
270-a, 270-b, 270-c Bit interleave processing unit
271a-, 271-b, 271-c Mapping processing unit
272 Hierarchy combining unit
273 Time interleave processing unit
274 Frequency interleave processing unit
275 OFDM frame configuration unit
276-a, 276-b Normalization unit
277-a, 277-b IFFT processing unit
278-a, 278-b Guard interval appending processing unit
279-a, 279-b Orthogonal modulation processing unit
511-a, 511-b A-D conversion unit
512-a, 512-b Orthogonal demodulation processing unit
513-a, 513-b Synchronization reproducing unit
514-a, 514-b FFT processing unit
515-a, 515-b Frame extracting unit
516-a, 516-b TMCC signal decoding unit
517-a, 517-b AC signal decoding unit
518 Carrier demodulation unit
519 Frequency deinterleave processing unit
520 Time deinterleave processing unit
521 First hierarchy dividing unit
522-a, 522-b, 522-c Demapping processing unit
523a-, 523-b, 523-c Bit deinterleave processing unit
524-a, 524-b, 524-c Depuncture processing unit
525 Hierarchy combining unit
526 Internal code decoding unit
527 Second hierarchy dividing unit
528-a, 528-b, 528-c Byte deinterleave processing unit
529-a, 529-b, 529-c Energy reverse diffusion unit
530 TS reproducing processing unit
531 External code decoding unit

The invention claimed is:

1. A broadcasting transmission system comprising:
at least one memory configured to store instructions; and
at least one processor configured to execute the instructions to:
input data for ordinary quality image reproduction according to terrestrial digital television broadcasting and data for high quality image reproduction;
combine the data for the ordinary quality image reproduction and the data for the high quality image reproduction;
generate transmission data for one of a plurality of polarized antennas and transmission data for another of the plurality of polarized antennas, based on combined data acquired by combining the data for the ordinary quality image reproduction and the data for the high quality image reproduction;
convert the transmission data for one of a plurality of polarized antennas and the transmission data for another of the plurality of polarized antennas into bitstreams in an order of most significant bit (MSB) first; and
calculate an exclusive OR by a predetermined pseudo-random binary sequence (PRBS), and a bit sequence except for a synchronous byte in the bitstreams, wherein
the at least one processor is further configured to generate the transmission data for the one of the plurality of polarized antennas and the transmission data for the another of the plurality of polarized antennas, in such a way that data based on the data for the high quality image reproduction is included in both of the transmission data for the one of the plurality of polarized antennas and the transmission data for the another of the plurality of polarized antennas, and
generate the transmission data for the one of the plurality of polarized antennas and the transmission data for the another of the plurality of polarized antennas, in such a way that data for a mobile reception service based on the data for the ordinary quality image reproduction are included in the transmission data for the one of the plurality of polarized antennas, and
wherein the one of the plurality of polarized antennas is installed in such a way as to radiate an electromagnetic wave having a same polarization plane as a polarization plane of an electromagnetic wave for terrestrial digital television broadcasting.

2. The broadcasting transmission system according to claim 1, wherein the at least one processor is further configured to:
generate the transmission data for the one of the plurality of polarized antennas and the transmission data for the another of the plurality of polarized antennas, in such a way that data based on the data for the ordinary quality image reproduction are included in the transmission data for the one of the plurality of polarized antennas among the transmission data for the one of the plurality of polarized antennas and the transmission data for the another of the plurality of polarized antennas.

3. A broadcasting reception system comprising:
at least one memory configured to store instructions; and
at least one processor configured to execute the instructions to:
reproduce data for ordinary quality image reproduction and data for high quality image reproduction, based on data received via one of a plurality of polarized antennas and data received via another of the plurality of polarized antennas, the reproduced data being transmitted by a broadcasting transmission system comprising:
at least one memory configured to store instructions; and
at least one processor configured to execute the instructions to:
input the data for the ordinary quality image reproduction according to terrestrial digital television broadcasting, and the data for the high quality image reproduction;
combine the data for the ordinary quality image reproduction and the data for the high quality image reproduction;
generate transmission data for the one of the plurality of polarized antennas and transmission data for the another of the plurality of polarized antennas, based on combined data acquired by combining the data for the ordinary quality image reproduction and the data for the high quality image reproduction; and convert the transmission data for one of a plurality of polarized antennas and the transmission data for another of the plurality of polarized antennas into bitstreams in an order of most significant bit (MSB) first; and calculate an exclusive OR by a predetermined pseudo-random binary sequence (PRBS), and a bit sequence except for a synchronous byte in the bitstreams, wherein the at least one processor of the broadcasting transmission system is further configured to generate the transmission data for the one of the plurality of polarized antennas and the transmission data for the another of the plurality of polarized antennas, in such a way that data based on the data for the high quality image reproduction are included in both of the transmission data for the one of the plurality of polarized antennas and the transmission data for the another of the plurality of polarized antennas, and generate the transmission data for the one of the plurality of polarized antennas and the transmission data for the another of the plurality of polarized antennas, in such a way that data for a mobile reception service based on the data for the ordinary quality image reproduction are included in the transmission data for the one of the plurality of polarized antennas, and wherein the one of the plurality of polarized antennas is installed in such a way as to radiate an electromagnetic wave having a same polarization plane as a polarization plane of an electromagnetic wave for terrestrial digital television broadcasting.

4. A broadcasting transmission/reception system comprising:

the broadcasting transmission system according to claim 1; and the broadcasting reception system according to claim 3.

5. A broadcasting transmission method comprising:

inputting data for ordinary quality image reproduction according to terrestrial digital television broadcasting and data for high quality image reproduction;

combining the data for the ordinary quality image reproduction and the data for the high quality image reproduction;

generating transmission data for one of a plurality of polarized antennas and transmission data for another of the plurality of polarized antennas, based on combined data acquired by combining the data for the ordinary quality image reproduction and the data for the high quality image reproduction;

converting the transmission data for one of a plurality of polarized antennas and the transmission data for another of the plurality of polarized antennas into bitstreams in an order of most significant bit (MSB) first; and calculating an exclusive OR by a predetermined pseudo-random binary sequence (PRBS), and a bit sequence except for a synchronous byte in the bitstreams, generating the transmission data for the one of the plurality of polarized antennas and the transmission data for the another of the plurality of polarized antennas, in such a way that data based on the data for the high quality image reproduction are included in both of the transmission data for the one of the plurality of polarized antennas and the transmission data for the another of the plurality of polarized antennas, and generating the transmission data for the one of the plurality of polarized antennas and the transmission data for the another of the plurality of polarized antennas, in such a way that data for a mobile reception service based on the data for the ordinary quality image reproduction are included in the transmission data for the one of the plurality of polarized antennas, and wherein the one of the plurality of polarized antennas is installed in such a way as to radiate an electromagnetic wave having a same polarization plane as a polarization plane of an electromagnetic wave for terrestrial digital television broadcasting.

* * * * *